United States Patent [19]

Athenes et al.

[11] Patent Number: 5,892,760
[45] Date of Patent: Apr. 6, 1999

[54] DEVICE FOR BINARY DATA TRANSFER BETWEEN A TIME-DIVISION MULTIPLEX AND A MEMORY

[75] Inventors: Claude Athenes, Paris; Jean-Claude Audrix, Saint Martin d'Uriage; Bernard Louis-Gavet, Saint Egreve, all of France

[73] Assignee: SGS-Thomson Microelectronics S.A., Saint Genis, France

[21] Appl. No.: 690,927

[22] Filed: Aug. 1, 1996

[30] Foreign Application Priority Data

Aug. 3, 1995 [FR] France ...................... 95 09637

[51] Int. Cl.⁶ .............. H04J 3/00; H04L 12/52; H04Q 11/08
[52] U.S. Cl. .............. 370/379; 370/382; 370/409; 370/498
[58] Field of Search .................. 370/356, 360, 370/379, 382, 399, 458, 476, 498, 397, 409, 378, 383, 375, 376; 395/842, 846

[56] References Cited

U.S. PATENT DOCUMENTS

| | | | |
|---|---|---|---|
| 4,718,058 | 1/1988 | Van Vugt | 370/63 |
| 4,782,478 | 11/1988 | Day, Jr. et al. | 370/356 |
| 5,144,623 | 9/1992 | Bernardini | 370/470 |
| 5,351,239 | 9/1994 | Black et al. | 370/476 |
| 5,668,807 | 9/1997 | Shachar et al. | 370/378 |

OTHER PUBLICATIONS

French Search Report from French Patent Application No. 95 09637, filed Aug. 3, 1995.

International Switching Symposium –Paper B7.1, vol. 3, 15–20 Mar. 1987, Phoenix (US), pp. 545–549 S. Morita, et al. "Elastic Basket Switching–A New Integrated Switching System For Voice and High–Speed Burst Data".

Proceedings of the IEEE 1991 Custom Integrated Circuits Conference –Paper 3,4, May 12–15, 1991, San Diego (US), p. 104, S. Shinagawa, et al., "A Multi–Speed Digital Cross–Connect Switching VLSI Using New Circuit Techniques in Dual Port RAMs".

*Primary Examiner*—Hassan Kizou
*Attorney, Agent, or Firm*—Wolf, Greenfield & Sacks, P.C.

[57] ABSTRACT

A device for transferring binary data between a time-division multiplex and a RAM includes circuitry for assigning, for each time slot of the multiplex, a logical channel number. This enables two HDLC controllers, respectively for transmission and reception, to be shared between all the channels of the multiplex.

17 Claims, 4 Drawing Sheets

| IT | | | | | | | | | | | |
|---|---|---|---|---|---|---|---|---|---|---|---|
| 0 | V11(0) | V10(0) | V9(0) | V1-V8 (0) | CH5(0) | CH4(0) | CH3(0) | CH2(0) | CH1(0) | | |
| 1 | V11(1) | V10(1) | V9(1) | V1-V8 (1) | CH5(1) | CH4(1) | CH3(1) | CH2(1) | CH1(1) | | |
| 2 | V11(2) | V10(2) | V9(2) | V1-V8 (2) | CH5(2) | CH4(2) | CH3(2) | CH2(2) | CH1(2) | | |
| y | V11(y) | V10(y) | V9(y) | V1-V8 (y) | CH5(y) | CH4(y) | CH3(y) | CH2(y) | CH1(y) | | |
| 31 | V11(31) | V10(31) | V9(31) | V1-V8 (31) | CH5(31) | CH4(31) | CH3(31) | CH2(31) | CH1(31) | | |

Fig 2

DEVICE FOR BINARY DATA TRANSFER BETWEEN A TIME-DIVISION MULTIPLEX AND A MEMORY

BACKGROUND OF THE INVENTION

1. Field of the Invention

The present invention relates to a device for exchanging binary data between a multiplex of several time slots and a memory. For the present invention, "multiplex" means a transmission by time-division multiplex (TDM).

The present invention more specifically applies to such a device for transferring binary data between a multiplex of thirty-two time slots TS and a memory.

2. Discussion of the Related Art

Such a device is to be found, for example, on boards, called subscriber boards, of switch centers of a telecommunication network. These subscriber boards are especially meant for branching different transmissions which arrive on one or several incoming multiplexes towards one or several outgoing multiplexes. The data relative to the transmissions as well as the information required for their processing (for example, the transmission mode, the destination, etc.) thus only transit through these subscriber boards. A subscriber board includes a RAM for temporarily storing the digital information and, if necessary, the binary data relative to the transmissions. The subscriber board also includes a microprocessor for, in particular, controlling the exchanges between the different board components and, in particular, the acoesses to the memory. A transfer device to which the present invention applies can also be found, for example, in the sender-receiver of a group switching center of a telephone network.

The transmissions which transit through the subscriber boards can be of different types, that is, correspond to different rates and be coded according to different frames. All these transmissions are associated with digital information which enable the identification of all of their characteristics (type of transmission, destination, etc.) to ensure their adequate routing. A transmission channel includes, according to the transmission rate, one or several time slots TS of the multiplex. For example, on a multiplex with thirty-two time slots TS where each time slot TS contains an eight-bit word, a channel at 2.048 Mbits/s or thirty-two channels at 64 Kbits/s or, further, two-hundred and fifty-six channels at 8 Kbits/s can be formed. In practice, two of the thirty-two time slots TS of the multiplex are reserved, one for the synchronizing of the multiplex and the other for the transfer of a signaling relative to the thirty other time slots TS.

In conventional devices for binary data transfer between the multiplex and the memory, each time slot TS is associated with a High Level Data Link Controller (HDLC), and a Direct Memory Access Controller (DMAC). The function of these controllers is to enable processing of the information relative to the transmissions and to transfer them, for example, from an incoming multiplex to an outgoing multiplex, and conversely.

For example, for a multiplex of thirty-two time slots TS, thirty-two HDLCs and thirty-two DMACs are used, each time slot TS being associated with one HDLC and one DMAC. For example, in the presence of a transmission at 2 Mbits/s, all controllers are used for a same transmission channel occupying all the time slots TS of the multiplex. Conversely, for transmissions at 64 Kbits/s, one HDLC and one DMAC are assigned to each transmission channel. The bits transmitted by the HDLCs are multiplexed by time-division on a frame of the multiplex. The bits transmitted by an HDLC are always positioned in the same time slot TS of each frame of the multiplex.

The microprocessor has the function, in particular, to organize the exchanges between the different controllers and the RAM to enable the data transfer.

SUMMARY OF THE INVENTION

The present invention aims at providing a device for transferring binary data between a multiplex of several time slots and a memory without using the microprocessor during the data transfers.

The present invention also aims at providing a device of this type with a reduced number of HDLCs and DMACs.

The present invention further aims at providing a device which enables a multi-channel operation, whether in HDLC mode, that is, using a frame format according to HDLC standards, or in transparent mode, that is, not using an HDLC frame format.

To achieve these objects, the present invention provides a device for transferring binary data between a time-division multiplexer and a RAM, including means for assigning, to each time slot of the multiplex, a logic channel number to enable the sharing of two HDLCs, respectively for transmission and reception, between all the channels of the multiplex.

According to an embodiment of the present invention, these means include a time slot assignment memory which is programmable by a microprocessor and two first auxiliary memories associated with the HDLCs, respectively for transmission and reception, the assignment and auxiliary memories having a number of words corresponding to the maximum number of possible multiplex channels, each word of the assignment memory containing at least the number of the logic channel to which the corresponding time slot is assigned, this number of the logic channel being sent, as an address, at least to the first auxiliary memories.

According to another embodiment of the present invention, the addressing of the time slot assignment memory is performed, for a time slot, by means of a counter of which the least significant bit of the bits which constitute the address of a time slot is incremented for each new time slot of the frame of the multiplex, the bits issued by the counter and constituting the address of a time slot being sent to a first input of a first multiplexer, a second output of which receives an address issued by the microprocessor, this second input being selected, by the microprocessor, at the beginning of a new transmission associated with a considered time slot.

According to another embodiment of the present invention, the time slot assignment memory further contains, for the HDLCs, a number of set bits at least equal to the number of bits contained in each time slot of the frame of the multiplex and one bit for enabling the presence of at least one transmission which uses only one bit of the corresponding time slot in the frame of the multiplex, the state of each of the set bits indicating the position of the bits of the considered time slot which contain information relative to the transmission with which this time slot is associated.

According to another embodiment of the present invention, the counter is a nine-bit counter incremented by the bit clock of the frame of the multiplex and whose three least significant bits are sent to the HDLCs, the most significant bit of the counter determining the even or odd rank of the current frame of the multiplex and being combined with the enable bit, the five intermediate bits constituting the address of the considered time slot in the time slot assignment memory and the eight least significant bits of the counter being reset for each new frame of the multiplex.

According to another embodiment of the present invention, each HDLC is associated with a control memory, respectively for transmitting and receiving, programmable by the microprocessor, the reading of which is addressed by the logic channel number issued by the time slot assignment memory, each control memory containing, for each logic channel, characteristics relative to the type of transmission associated therewith and, in particular, at least one bit for configuring the transmission or reception HDLC, between a transparent mode where the HDLC does not process the data and a mode where it performs a processing relative to an HDLC frame.

According to another embodiment of the present invention, the device includes at most two direct memory access controllers, respectively associated with the transmit and receive HDLCS, the DMACs being also shared between all the channels of the multiplex.

According to another embodiment of the present invention, the device includes two flow control FIFO memories, respectively for transmission and reception, for storing the logic channel number issued by the time slot assignment memory as well as an encoded instruction issued by the HDLCs, respectively for transmission and reception, the logic channel number contained in each flow control memory being used as an address for a second auxiliary memory which is associated with each DMAC, respectively for transmission and reception, the encoded instruction being addressed to the DMAC.

According to another embodiment of the present invention, the logic channel number read from each flow control memory constitutes the write address in a data transfer memory which is associated with the DMAC with which this flow control memory is associated, the read address of the transfer memory corresponding to the logic channel number read from the time slot assignment memory.

According to another embodiment of the present invention, the receive HDLC controller is associated with a memory for recognizing an address field of the receiver which is the destination of a point/multi-point mode transmission, the address field recognition memory being written by the microprocessor and read by the receive HDLC controller upon command of the receive control memory.

These objects, features and advantages, as well as others, of the present invention will be discussed in detail in the following description of a specific embodiment, taken in conjunction with the following drawings, but not limited by them.

BRIEF DESCRIPTION OF THE DRAWINGS

FIG. 2 shows a way of organizing a memory for assigning the time slots of the multiplex according to the invention;

DETAILED DESCRIPTION

For clarity, only the elements and connections necessary to the understanding of the invention have been shown. Moreover, same elements have been designated by same reference numbers in the different drawings.

Figure 1:
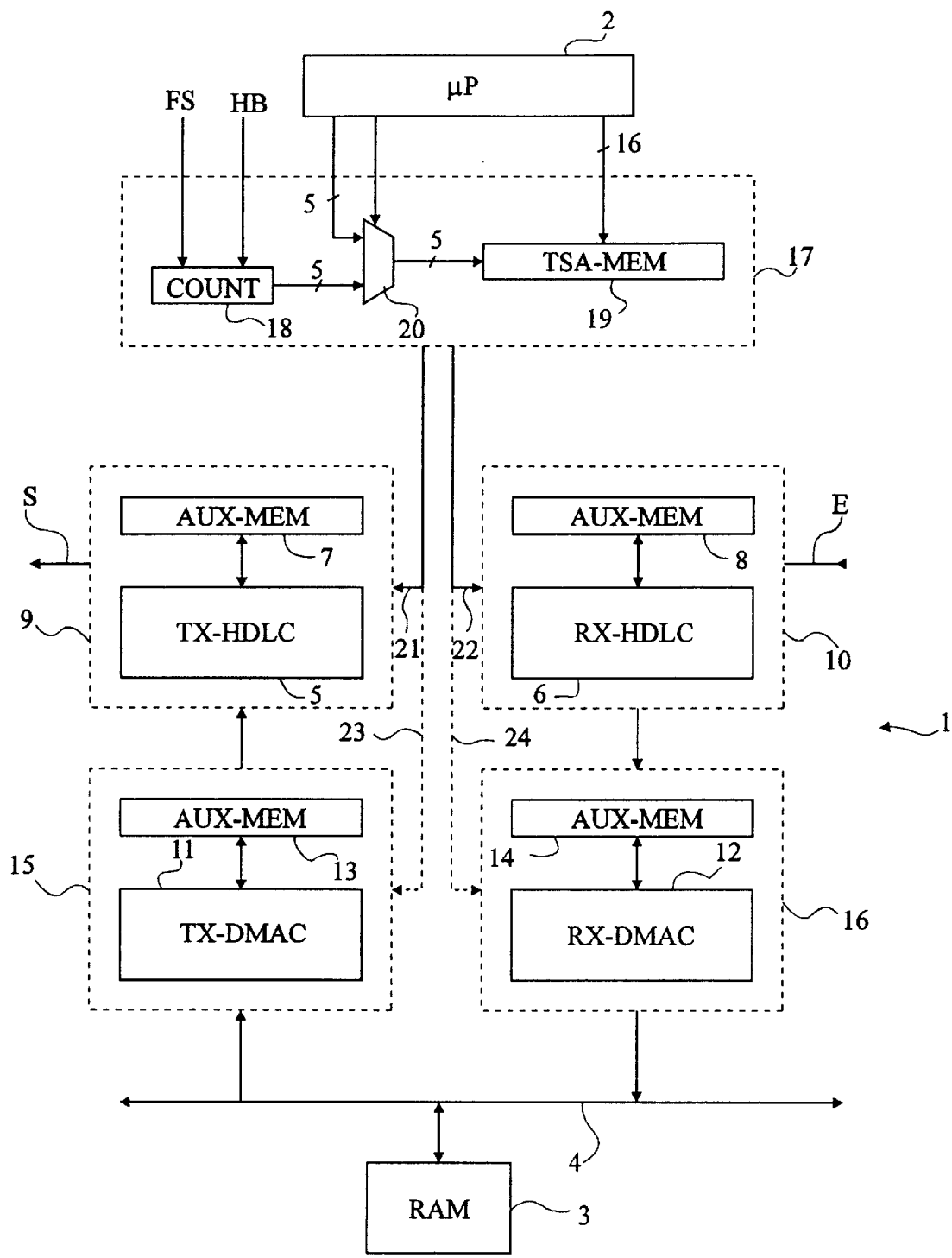
FIG. 1 schematically shows a device for transferring binary data between a RAM and a multiplex according to the invention.

FIG. 1 illustrates, in the form of a block diagram, the structure of a transfer device according to the invention. The device 1 according to the invention is associated with a microprocessor 2 and with a RAM 3, in particular, via a bus 4. In practice, bus 4 is comprised of a data bus, an address bus and a single-wire bus indicative of the task (reading or writing) to be performed on memory 3.

Device 1 includes, according to the invention, two data link controllers, or HDLCs, respectively TX-HDLC 5 on the transmit side and RX-HDLC on the receive side. These controllers 5 and 6 are, according to the invention, shared between different time slots TS of a time-division multiplex (TDM), and thus between different transmission channels if the multiplex is a multi-channel multiplex. For this purpose, each of these controllers 5 and 6 is associated with a first auxiliary memory AUX-MEM, respectively 7 and 8, having a number of words which corresponds to the number of channels which can be taken into account. For example, for a device 1 for organizing the transfer between memory 3 and a multiplex of thirty-two time slots TS, each memory 7 and 8 includes thirty-two words.

The association of controller 5 with memory 7 constitutes a multi-channel HDLC, or multi-HDLC 9, for transmission. The output S of this controller 9 transmits time slots TS, each containing eight bits on a multiplex of thirty-two time slots TS.

The association of controller 6 with memory 8 constitutes a multi-channel HDLC, or multi-HDLC 10, for reception, the input E of which receives the time slots TS of the thirty-two time slot multiplexer.

A feature of the present invention is that device 1 includes, at most, two Direct Memory Access Controllers, or DMACs, respectively TX-DMAC 11 and RX-DMAC 12. These controllers 11 and 12 are shared between the different transmission channels which have been defined if the multiplex is a multi-channel. For this purpose, each DMAC 11 or 12 is associated, like each HDLC 5 or 6, with a second auxiliary memory AUX-MEM, respectively 13 and 14. The number of words of auxiliary memories 13 and 14 corresponds to the number of channels constituted, for example thirty-two. If, as shown, device 1 includes two DMACs 11 and 12, one controller is associated with the transmit side and the other controller is associated with the receive side.

The association of controller 11 with memory 13 constitutes a multi-channel DMAC, or multi-DMAC 15, for transmission. Multi-DMAC 15 has the function of transferring the binary data relative to the different channels and contained in memory 3 to the multi-HDLC transmit controller 9, for example, so that it transmits them according to an HDLC frame format.

The association of controller 12 with memory 14 constitutes a multi-channel DMAC, or multi-DMAC 16, for reception. Multi-DMAC 16 has the function of transferring the binary data relative to the different channels from the multi-HDLC receive controller 10 to memory 3.

Should the case arise, a single multi-DMAC can be used for the entire device 1 by adapting the sizes of the different memories associated therewith. However, an advantage of using two multi-DMACs is that it enables the device to simultaneously process the transmission and the reception of data.

Another feature of the present invention is the assignment to each physical time slot TS of a frame of the multiplex, a logic channel CHx. This assignment is meant to enable multi-HDLCs 9 and 10 and multi-DMACs 15 and 16 to differentiate the transmission channels with which the time slots TS are associated. One or several given time slots TS keep the same logic channel number CHx all along its (their) presence in device 1. This logic channel number is not transmitted with the frame of the multiplex. It is used, within device 1, to identify the channel under processing, more specifically to identify which time slots the channel belongs to.

For a telecommunication network, a time slot TS of the multiplex includes eight bits. The duration of a frame of a multiplex with thirty-two time slots TS is standardized to 125 microseconds, which corresponds to a frequency of 8 KHz. The duration of a bit is thus approximately 488 nanoseconds and the duration of a time slot TS is approximately 3.9 microseconds.

According to the type of data to be transferred by time-division multiplex, some time slots TS can be assigned a same logic channel.

For example, for a transmission channel at 2.048 Mbits/s, the thirty-two time slots TS are assigned a same logic channel number which constitutes a super-channel including the thirty-two time slots TS of the multiplex.

If the transmission is a transmission of the type 2B+D, two, for example successive, time slots TS are assigned the same logic channel number CHx by the device according to the invention. These two time slots TS contain the two channels B at 64 Kbits/s of the frame 2B+D.

The assignment of the time slots TS to the logic channels CHx is performed, according to the invention, by means of a circuit 17. This circuit 17 for assigning time slots TS has the function of individualizing each time slot TSy of a frame of the multiplex while it is present in device 1 and associating a logic channel CHx thereto so that the multi-HDLCs and multi-DMACs may identify it.

According to the invention, this circuit 17 includes a counter 18, of at least five bits, the resetting of which is synchronized with the start FS of each frame of the multiplex. The incrementing of counter 18 is synchronized with the start of each time slot TS of the multiplex and thus corresponds to a frequency of 256 KHz.

The five bits of counter 18 are used to address an assignment memory 19. This memory 19 is programmable by microprocessor 2. In other words, the data stored in memory 19 come from a table (not shown) to which microprocessor 2 has access. Memory 19 includes as many words as there are time slots TS to be assigned in the multiplex, that is, in the present example, thirty-two words.

The function of assignment memory 19 is to contain, for example on sixteen bits, the logic channel number CHx associated with each time slot TSy of the frame of the multiplex as well as digital information characteristic of the transmission channel to which this logic channel CHx is assigned. The rank y, in memory 19, of a time slot TSy corresponds to the rank of the word in memory 19, that is, to the address y issued by counter 18. The address y of memory 19 is imposed by microprocessor 2 when assigning the channel. For this purpose, the address input of memory 19 is connected to the output of a first multiplexer 20. Two inputs of this multiplexer 20 receive, respectively and on five bits, the result issued by counter 18 and an address issued by microprocessor 2. Multiplexer 20 is controlled by microprocessor 2 but with a priority for the address issued by counter 18.

FIG. 2 illustrates the structure of assignment memory 19 which is, for example, a memory of thirty-two sixteen-bit words.

Five first bits, respectively $CH_1$ to $CH_5$, stand for the logic channel number CHx of the considered time slot TSy. According to the type of transmission, a same logic channel number CHx can be associated with several time slots TSy of the frame of the multiplex. For example, in the presence of transmissions at 8 Kbits/s over the whole frame of the multiplex, each time slot TSy is assigned a different logic channel number CHx. In the presence of a transmission coded according to the 2B+D standard, the two 0 time slots TSy of the two channels B at 64 Kbits/s are assigned a same logic channel number CHx. If all time slots TSy relate to a transmission at 2 Mbits/s, the thirty-two time slots TS are assigned a same logic channel number CHx.

The numbers indicated in parenthesis in FIG. 2 represent the address y issued by counter 18 and not the logic channel number CHx. In other words, these numbers represent the rank y of time slot TSy in the frame of the multiplex.

The eight following bits V1 to V8 are bits for setting the bits of time slot TSy which are used for the transmission channel associated with this time slot TSy in the frame of the multiplex. These bits V1 to V8 determine the bit(s) belonging to logic channel CHx in the considered time slot TSy, as well as their location. In other words, each logic channel CHx is constituted by eight sub-channels (each time slot TSy contains eight bits) and bits V1 to V8 enable the identification of the sub-channel(s) used in the considered time slot TSy. If bits V1 to V8 are all at zero, there is no logic channel in the considered time slot.

For example, if a given time slot TSy corresponds to a transmission channel at 64 Kbits/s, the eight bits V1 to V8 of the word, associated with this time slot TSy in memory 19, are at state "1". Indeed, for a rate of 64 Kbits/s, the eight bits of the time slot TSy of the frame of the multiplex are used.

If a given time slot TSy is assigned to a transmission channel at 8 Kbits/s, a single one of bits V1 to V8 is at state "1". The position of the bit which is at state "1" indicates which of the eight bits contained in time slot TSy belongs to the considered transmission channel. If a given time slot TSy is assigned to a transmission channel at 16 Kbits/s, two of the bits V1 to V8 of the word associated with this time slot TSy in memory 19 are at state "1".

In the presence of a transmission channel at 2 Mbits/s, thirty of the thirty-two time slots TSy are assigned the same logic channel number CHx and all the bits V1 to V8 of the thirty words, associated with these time slots TSy in memory 19, are at state "1". Therefore, as has been stated above, only thirty of the thirty-two time slots TS of the multiplex are assigned to the transmission channel itself. Thus, for a transmission channel at 2 Mbits/s, the rate of this channel is not 2.048 Mbits/s (32×8×8000), but 1.920 Mbits/s (30×8×8000). It should however be noted that the two time slots TS assigned to the signaling (generally the first $TS_0$ and seventeenth $TS_{16}$ time slots) are also processed by the device according to the invention. Two logic channels CHx are assigned thereto to enable the transfer of the signaling by means of the device.

The fourteenth bit V9 of the words of memory 19 is a bit for enabling the presence, within the corresponding time slot TSy, of at least one transmission at 4 Kbits/s. If bit V9 is at state "1", each bit V1 to V8 is taken into account once every 250 microseconds, that is, once every two periods of the 8 KHz frequency. Therefore, for a transmission at 4 Kbits/s, each bit is transmitted twice, that is, in two consecutive frames. The bit V9 set at "1" enables each data word to be taken into account only once every second cycle. If bit V9 is at state "0", each bit V1 to V8 is taken into account once every 125 microseconds, that is, once per 8 KHz clock period, which corresponds to the other transmission modes.

An advantage of providing this bit V9 is that it avoids the need for a 4 KHz clock for the transmissions at 4 Kbits/s. In addition, such a clock should imperatively be synchronized on the 8 KHz frequency.

The last two bits V10 and V11 of memory 19 are used so that the data to be transmitted are not only sent to the multiplex but also to a special output (not shown) with detection of collision. This output is used when a same time slot TS is shared between several sources according to a so-called point/multipoint arrangement, for example between several HDLCs. In this case, a Carrier Sense Multiplex Access (CSMA) protocol is used.

The input of multiplexer 20 which is connected to microprocessor 2 is selected at the beginning of a new transmission to write, into memory TSA-MEM 19, the logic channel number CHx associated with this transmission channel at the address of one or several time slots TS of the frame of the multiplex. The input connected to counter 18 is then selected for the whole transmission to address the reading of memory TSA-MEM 19 according to the current time slot TSy of the frame of the multiplex.

Preferably, counter 18 is a counter over at least eight bits with a counting frequency which corresponds to bit clock HB, that is, 2.048 MHz. The five most significant bits are then used, as the address of memory 19.

An advantage of using an 8-bit counter 18 is that the three least significant bits of this counter are used to enable the data of memory TSA-MEM 19. They are also used to enable the reading out by controller TX-HDLC 5 of the bits V1 to V8 contained within a same word associated with a given time slot TSy. Such a synchronization is particularly useful, for example, in the case where a same time slot TSy contains several transmissions at 8 Kbits/s. Therefore, it then enables controller TX-HDLC to identify, successively in time and within time slot TSy, the position of the 8 Kbits/s transmissions.

According to the invention, bit V9 of memory 19 is used, for reception and by controller RX-HDLC 6, to determine whether it can process only once every second cycle the bits which arrive for the corresponding channel.

For this purpose, according to the invention and on the receive side, a NAND combination of this bit V9 with a ninth most significant bit of counter 18 is used. This ninth bit identifies each frame of the multiplex as an even or odd frame. Thus, combining this bit with bit V9 instructs controller RX-HDLC 6 to take into account every second frame the bits of a time slot TSy corresponding to transmissions at 4 Kbits/s. It should be noted that the resetting of counter 18 by signal FS for synchronizing the frame of the multiplex must then affect the eight least significant bits of this counter only.

In transmission, bit V9 is interpreted by controller TX-HDLC 5 to indicate whether the bits are to be issued twice in a row, that is, in two consecutive frames of the multiplex. For this purpose, an AND combination of the ninth most significant bit of counter 18 with bit V9 is used to determine on which frames of the multiplex the data bits which have been transmitted during the preceding frame are to be repeated.

Although it has not been shown, multi-HDLCs 9 and 10 are driven by a clock signal conditioned by bits V1 to V11 to enable them to exploit the information contained in the bits.

A feature of the present invention is that the five bits $CH_1$ to $CH_5$ are used, by device 1 and as will be seen later, sometimes as an address and sometimes as data for the memories associated with device 1.

As an address, they are in particular sent onto the address inputs, respectively 21 and 22, of the auxiliary memories 7 and 8 associated with HDLCs 5 and 6. Thus, these HDLCs are capable of knowing which transmission channel is to be processed. They are also sent (connections in dotted lines 23 and 24 in FIG. 1) onto the address inputs of the auxiliary memories 13 and 14 associated with DMACs 11 and 12.

An advantage of the present invention is that once microprocessor 2 has set the bits relative to the assignment of a time slot TSy in assignment memory 19, it is no longer necessary for it to be involved in the operation of device 1 for the binary data relative to this time slot TSy to be properly transferred by device 1. Indeed, the time slot(s) TSy associated with a given transmission channel are the same in all frames of the multiplex and the characteristics of each time slot TSy are kept in assignment memory 19. The reading out of these characteristics for the following frames of the multiplex is performed by means of counter 18 over nine bits. The number, over five bits, which represents the address y of time slot TSy in memory 19 is incremented for each time slot TS.

Another advantage of the present invention is that the transmissions present on a multiplex of thirty-two time slots TS can be transferred by means of a reduced number of HDLCs and DMACs.

Figure 3:
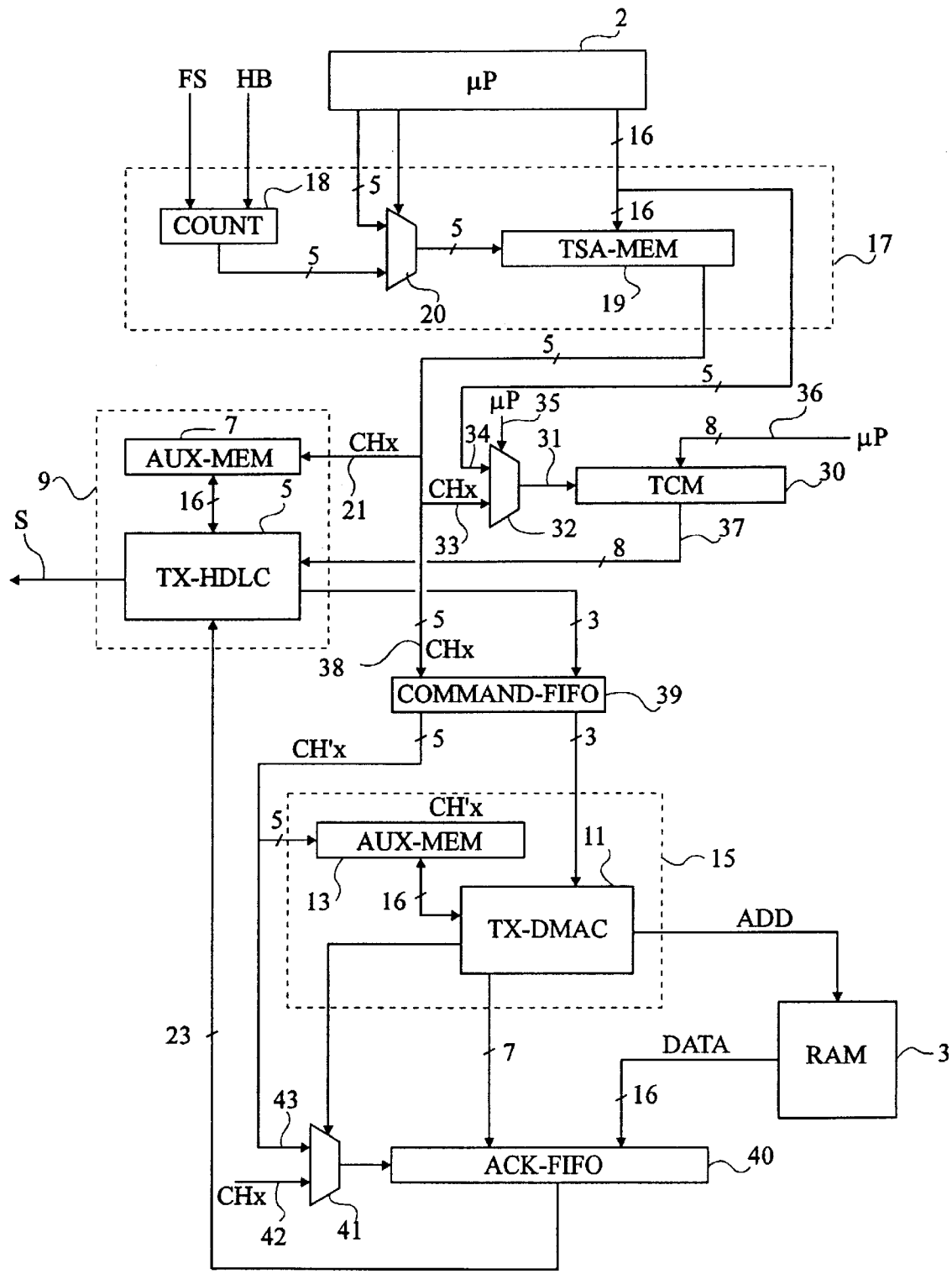
FIG. 3 shows, in the form of a block diagram, an embodiment of the transmit function of a transfer device according to the invention.
Figure 4:
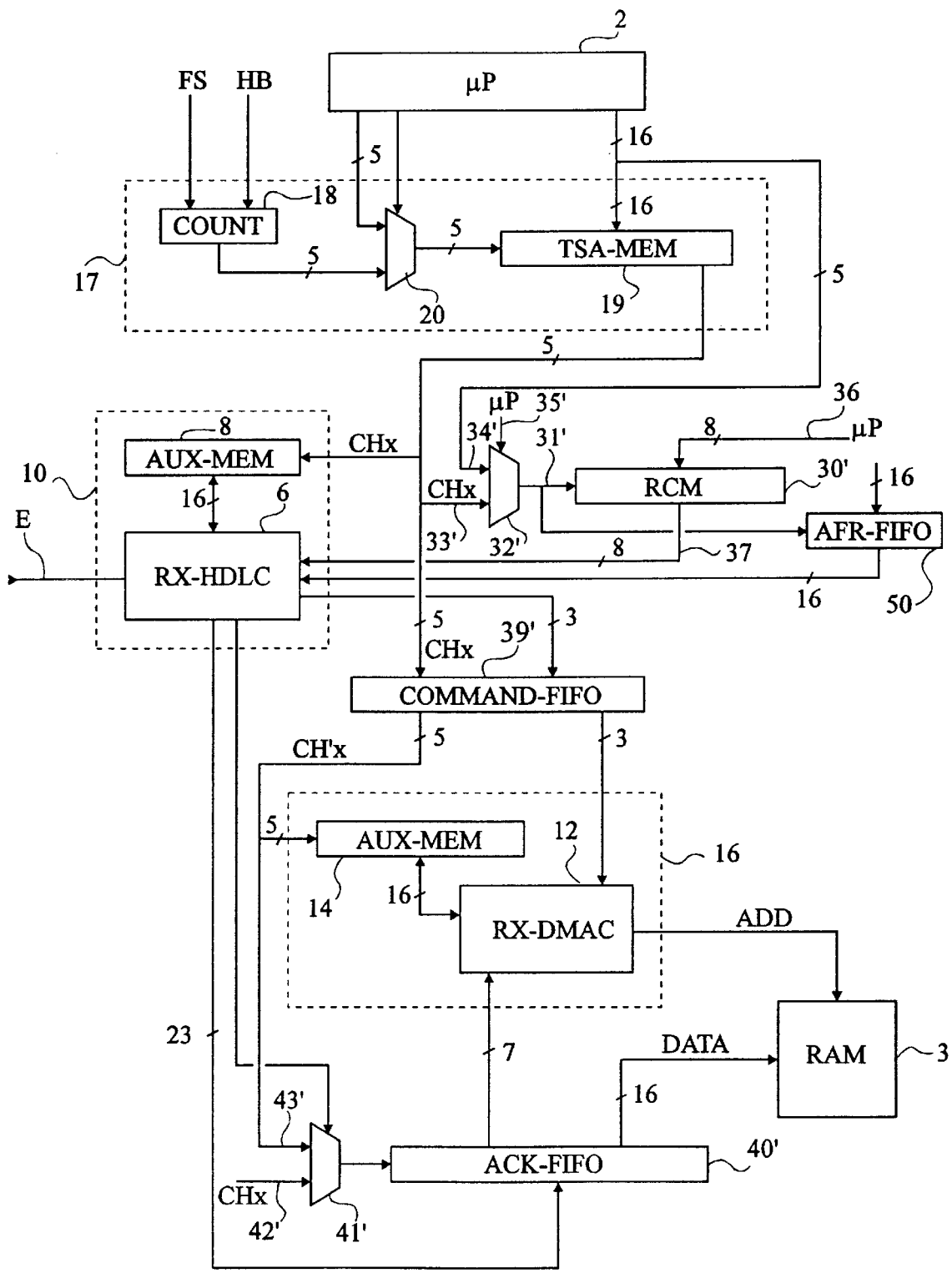
FIG. 4 shows, in the form of a block diagram, an embodiment of the receive function of a transfer device according to the invention.

The operation of device 1 according to the invention will become apparent from the following description of FIGS. 3 and 4.

For clarity, this operation is discussed by separating the transmit and receive sides of device 1.

FIG. 3 shows, in the form of a block diagram, an embodiment of a transfer device according to the invention, on the transmit side.

To transmit binary data to a multiplex of thirty-two time slots TS, these data are associated with digital information representative of the characteristics of the transmission to which they belong. These characteristics can be, for example, the transmission mode, the destination, etc.

This information is processed by the device according to the invention. The actual data are transmitted to the multiplex but are not modified other than by, according to the type of transmission, the conventional functional characteristics of controller TX-HDLC 5 as they are read out from memory 3 by means of controller TX-DMAC 11.

Attention will be particularly paid to the use of logic channels CHx which constitute a feature of the present invention, and the functions which correspond to the conventional functions of the HDLCs and DMACs will not be detailed.

On the transmit side, controller TX-HDLC 5 is associated with a transmission control memory TCM 30. This memory 30 has the function of containing, for multi-HDLC 9, information relative to its operating mode according to the type of transmission. The number of words of memory TCM 30 corresponds to the number of possible logic channels, that is, in this case, thirty-two words. The size of the words of this memory TCM 30 is, for example, eight bits. This memory TCM 30 is addressed by means of the logic channel number CHx. The address input 31 of memory TCM 30 is connected to the output of a second multiplexer 32 with two inputs 33 and 34. Inputs 33 and 34 receive the five bits $CH_1$ to $CH_5$, respectively, issued by memory TSA-MEM 19 and formerly written into this memory 19 by microprocessor 2. The control input 35 of multiplexer 32 is connected to microprocessor 2.

Input 34 is selected for the writing (or the reading for testing purposes) by microprocessor 2 of characteristics of the frame of a new transmission associated with a logic channel CHx in memory 30. Afterwards, input 33 is selected for the whole duration of the transmission for the reading of these characteristics by controller TX-HDLC 5 each time it processes this logic channel CHx, that is, at least once per frame of the multiplex.

It should be noted that the sizing of thirty-two words of control memory TCM 30 actually corresponds to the maximum logic channel numbers CHx which can be assigned to the time slots TSy of a frame of the multiplex. Therefore, in the case where a same logic channel CHx is assigned to several time slots TSy, not all the words of memory 30 are used.

The data input 36 of memory TCM 30 is connected to microprocessor 2, from which it receives the characteristics of the frame of the transmission associated with the current logic channel, eventually via bus 4 (not shown in FIG. 3). The data output 37 of memory TCM 30 is connected to the controller TX-HDLC 5 to which the data are addressed.

These data correspond to the information conventionally sent to an HDLC to control its operating mode. It should be noted that two configuration bits contained within memory 30 indicate, by their states, whether controller TX-HDLC 5 is to operate in HDLC mode, that is, the transmission associated with the logic channel is to be transmitted according to an HDLC frame format, or it is to operate in transparent mode, that is, let the data bits pass without processing them. In other words, memory TCM 30 enables, for each logic channel CHx, controller TX-HDLC 5 to operate either in HDLC mode or in transparent mode.

As has already been stated in relation with FIG. 1, the input address 21 of auxiliary memory 7 receives the number of the logic channel CHx to be processed. This auxiliary memory 7 thus includes, like memory TCM 30, a number of words (here, thirty-two) which corresponds to the maximum logic channel numbers CHx which can be associated with the time slots TSy of a frame of the multiplex. It should be noted that these two memories 7 and 30 are substantially addressed in the same way and can thus be combined in a same memory. Therefore, except for the programming of memory TCM 30 where the address is supplied by microprocessor 2, the address of memories 7 and 30 is supplied by the channel number CHx. It is thus enough, in the programming by microprocessor 2, to not fill in the sixteen bits of the area corresponding to memory 7.

The five bits $CH_1$ to $CH_5$ which stand for the number of a given logic channel CHx are also sent onto a data input of a FIFO memory 39 for controlling the flow of the transfer device. This memory 39 includes several words, for example thirty-two. Memory 39 contains the channel number CHx as data and this number will be used as an address by multi-DMAC 15.

The function of FIFO 39 is to enable a change in rate between the elements associated with controller TX-HDLC 5 which operate at bit speed and the elements associated with controller TX-DMAC 11 which operate at word speed. In other words, the operating mode of controller TX-HDLC 5 which is to issue, on output S, a series of bits at the rate of the bit clock HB of the multiplex is updated, especially according to the contents of control memory TCM 30, for each cycle of bit clock HB. Conversely, the operation of controller TX-DMAC 11, having the function, in particular, of sending the data to controller TX-HDLC 5 by reading words of sixteen bits from memory 3, is rated, for its needs of access to memory 39, at the word frequency.

At the end of each bit cycle, controller TX-HDLC 5 saves the context of the current channel in auxiliary memory 7. At the beginning of each bit cycle, it reads from memory 7 at the address of the channel that it has to process, the context saved in the processing of the preceding bit cycle associated with this channel.

The function of the auxiliary memory 13 associated with controller TX-DMAC 11 is identical to that of memory 7 but relative to the words of a channel instead of the bits.

Besides the five bits $CH_1$ to $CH_5$, memory 39 contains, for each logic channel CHx, three bits issued by controller TX-HDLC 5 which contain a coded instruction for controller TX-DMAC 11. At the beginning of each bit cycle, controller 5 sends an instruction which depends on the logic channel CHx on which it is operating. The three bits that it issues to flow control memory 39 enable to encode up to eight instructions. These can be, for example, an instruction to fetch data from RAM memory 3 or to reissue data relative to a frame in CSMA mode which has had a collision with another frame of higher priority, or relative to a frame of a transmission at 4 Kbits/s, the bits of which have to be transmitted twice in a row on the frame of the multiplex.

The contents of FIFO 39 are read, under control of controller TX-DMAC 11. The three instruction bits are then directly sent to controller TX-DMAC 11 for controlling the access to RAM memory 3 while the five bits $CH_1$ to $CH_5$ are sent, as an address, to the auxiliary memory 13 associated with controller TX-DMAC 11. These five bits here identify the logic channel on which controller TX-DMAC 11 is to operate. The logic channel is designated, on the side of controller 11, by CH'x since it does not necessarily correspond to the logic channel CHx on which controller TX-HDLC 5 operates, due to the rate difference between the two controllers 5 and 11.

The contents of auxiliary memory 13 enable controller TX-DMAC 11 to determine the address of RAM 3 storing the descriptors associated with the transmission channel for which controller TX-HDLC 5 has sent an instruction.

Thus, as it receives the instruction contained within memory 39, controller 11 knows which logic channel this instruction relates to. It is then able to calculate the address ADD of memory 3 where it has to fetch the descriptor and the data.

It should be noted that the addresses of memory 39 are independent from both multi-HDLC 9 and multi-DMAC 15. The access to this memory 39 is requested by controller 9 for writing and by controller 15 for reading. The writing by controller 9 holds the priority due to its rate of access to the memory.

When multi-DMAC 15 reads from memory 39, it reads a word having a channel number CH'x and the instruction associated therewith. This word corresponds to the first logic channel CHx processed by multi-HDLC 9 and not processed by controller 15.

If the instruction is an instruction for retrieving data from memory 3, controller TX-DMAC 11 then issues an address ADD on bus 4 (not shown in FIG. 3) directed to memory 3. Memory 3 then returns the data, in the form of a sixteen-bit word, to a transfer memory ACK-FIFO 40.

Memory 40 has a function opposite to that of memory 39. It is used to make the data read out from memory 3 available to multi-HDLC 9 to enable the controller to process them and/or transmit them.

Besides the data retrieved from memory 3 over sixteen bits, each word of memory 40 contains seven bits set by controller TX-DMAC 11 and supplying characteristics of this sixteen-bit word in the frame of the transmission channel associated with logic channel CH'x. These characteristics are, for example, indications of the rank of the sixteen-bit word in the frame (first or last word), the frame priority, etc. The twenty-three bits contained in each word of memory 40 are meant to be read by multi-HDLC 9 according to the logic channel CHx it is processing.

The addressing of memory 40 is performed by means of a third multiplexer 41 having a priority first input 42 which receives the number of the current logic channel CHx from the viewpoint of multi-HDLC 9, that is, the one it is going to process. Although not shown in FIG. 3, input 42 is connected with inputs 21 and 38 to the data output of memory 19. Input 42 is used to give the address at which the data are to be read by controller 9. A second input 43 receives the logic channel number CH'x read from memory 39. This input 43 is used by multi-DMAC 15 to write the data into memory 40. The control of multiplexer 41 is thus performed by multi-DMAC 15 but without holding the priority with respect to a reading of memory 40 by multi-HDLC 9.

The sixteen-bit words, read by multi-HDLC 9, are stored in its auxiliary memory 7 at the address defined by the current logic channel number CHx to enable it to transmit them after their processing, bit by bit, over one or several time slots of the multiplex according to the type of transmission.

An advantage of the present invention is that microprocessor 2 only acts on transfer device 1 at the beginning of each new transmission to write, into memory TSA-MEM 19, the transmission channel location(s) in the frame of the multiplex by assigning the corresponding time slot(s) TSy a logic channel number CHx. It writes the characteristics of the frame of this transmission into control memory TCM 30 and not the characteristics of the channel which are written into assignment memory 19.

Afterwards, neither multi-HDLC 9 nor multi-DMAC 15 uses microprocessor 2 during the whole transmission except, of course, in case of an incident which is notified thereto, for example, by an interrupt transmitted by multi-DMAC 15.

For clarity, the clock signals have not been shown. Similarly, the enabling of the data read at the output of memory TSA-MEM 19 through the three least significant bits of counter 18 and the taking into account of bits V1 to V8 by controller TX-HDLC 5 through these least significant bits have not been shown.

As a specific example, it is assumed that a transmission channel at 128 Kbits/s is associated with the time slots $TS_0$ and $TS_1$ of a frame of the multiplex. Bits $CH_1(0)$ to $CH_5(0)$ and $CH_1(1)$ to $CH_5(1)$ of the first two lines of memory 19 indicate the logic channel number CHx, for example 12 (01100) assigned to this transmission channel. As it is a transmission at 128 Kbits/s, bits V1(0) to V8(0) all are at state "1". Conversely, bits V9(0), V10(0), V11(0), V9(1), V10(1) and V11(1) all are at state "0". At the address 01100, memory 30 contains configuration information of controller TX-HDLC 5 for the frame to be transmitted in channel 12.

During the eight bit cycles of a first time slot of a frame of the transmission, counter 18 issues the read address 00000 of memory 19. Bits V1(0) to V8(0) are sent to controller TX-HDLC 5 at the bit clock rate during this time slot, using the three least significant bits of counter 18. Bits $CH_1(0)$ to $CH_5(0)$ are sent to address memory TCM 30, auxiliary memory 7 and memory 40. Thus, controller TX-HDLC 5 is able to transmit, on its output S and within time slot $TS_0$, eight bits from the sixteen bits which constitute the word to be transmitted in this frame and which are contained in auxiliary memory 7.

From the viewpoint of controller TX-DMAC 11, auxiliary memory 13 is addressed by bits $CH_1(0)$ to $CH_5(0)$ and the controller receives the three bits issued by controller TX-HDLC 5. Controller 11 will thus be able to execute the coded instruction from controller 5 as it will have processed the preceding instructions relative to other logic channels. It will then write into memory 40 at the address 01100 corresponding to channel number CH'x, which will enable controller TX-HDLC to fetch therefrom, for example, the data words it had requested.

In the following time slot $TS_1$, a similar operation is reproduced for each of the other eight bits of the word to be transmitted.

FIG. 4 shows, in the form of a block diagram, an embodiment of a transfer device according to the invention, on the receive side.

The structure and operation of the device, on the receive side, are substantially similar to those of the device on the transmit side. Elements which correspond to elements distinct from those of the transmit side and which carry same reference numbers for having a similar function and constitution have been designated by an apostrophe '.

The essential distinction is the fact that, on the receive side, the receiver which is the destination of the transmission has to be identified. That is, in a point/multipoint operation where a same time slot TS of the multiplex is shared between several transmissions, there can be several receivers which are destinations. It is thus necessary to perform a recognition of an address field contained in the frame of the transmission and to keep it in order to be able to associate, within memory 3, the words which correspond to this transmission and which are located in the successive frames of the same multiplex channel.

Generally, the destination or receiver of such a transmission is identified, in the transmission frame, by one or several bytes containing the specific address of a destination.

It is provided, according to the invention, to associate an address field recognition FIFO memory 50 with multi-HDLC 10. A word of memory 50 includes sixteen bits (two bytes) for containing the address field of the frame.

The reading of memory 50 is performed by multi-HDLC 10 while the writing in this memory 50 is performed by microprocessor 2.

On the receive side, controller RX-HDLC 6 is associated with a control memory RCM 30' having a function similar to that of control memory TCM 30, on the transmit side. In other words, memory RCM 30' is meant to contain, for controller RX-HDLC 6, information relative to its operating mode according to the type of transmission. As in the case of memory TCM 30, the number of words of memory RCM 30' corresponds to the number of channels defined, that is, here, thirty-two words. The size of the words of this memory RCM 30' is, for example, eight bits. The addressing of memory RCM 30' is performed by means of the logic channel number CHx. The address input 31' of memory RCM 30' is connected to the output of a multiplexer 32' having two inputs 33' and 34'. The two inputs 33' and 34' receive the five bits $CH_1$ to $CH_5$, respectively issued by memory TSA-MEM 19 and input into this memory 19. The control input 35' of multiplexer 32' is connected to microprocessor 2.

Memory 50 contains a number of words identical to that of a control memory RCM 30'. It is further addressed in the same way as memory RCM 30', which allows, if necessary, memories 50 and 30' to be combined in a single memory. Similarly, it should be noted that as for transmission, memory 50 is addressed substantially in the same way as auxiliary memory 8 with which it can thus be combined.

As the bits arrive on the input E of multi-HDLC 10, the controller stores them in its auxiliary memory 8 at the address of the logic channel CHx corresponding to the transmission channel with which the current time slot TSy is associated.

When a sixteen-bit word relative to a logic channel, and thus to a transmission channel, has been received by multi-HDLC 10, the controller sends it to transfer memory ACK-FIFO 40' to make it available to multi-DMAC 16 which must store it in RAM 3. At the same time, controller 10 sends to transfer memory 40' seven bits set by controller RX-HDLC 6. These seven bits supply characteristics of the sixteen-bit word in the channel of the transmission associated with logic channel CHx, especially, the location of the word in the frame of the transmission and the possible transmission errors which may have been detected.

Multiplexer 41' selects the address of memory ACK-FIFO 40' between two inputs 42' and 43'. These inputs 42' and 43' receive, respectively, the current channel number CHx from the viewpoint of multi-HDLC 10 and the current channel number CH'x from the viewpoint of multi-DMAC 16.

Input 42' is selected when controller 10 needs to write into memory ACK-FIFO 40'. Input 43' is selected when controller 16 needs to read the contents of the seven characteristic bits of the received sixteen-bit word for storing this sixteen-bit word in RAM 3 at an address ADD that it calculates according to the channel number CH'x. The control of the selection between the two inputs 42' and 43' is performed by multi-HDLC 10 which holds the priority due to its operating rate.

When it receives the instruction contained in flow control memory 39', controller 12 knows which logic channel the instruction relates to. It is then able to calculate the address ADD of memory 3 where it must write the data by using the contents of auxiliary memory 14.

It should be noted that memory TSA-MEM 19 is, according to the invention, common to the transmit and receive sides of the device.

Thus, neither multi-HDLC 10, nor multi-DMAC 16 uses microprocessor 2 during the whole reception, except, of course, in case of an incident which is notified thereto, for example, by an interrupt issued by multi-HDLC 10 or multi-DMAC 16.

As a specific example, it is assumed that a receive channel at 128 Kbits/s is associated with the time slots $TS_0$ and $TS_1$ of a frame of the multiplex. Bits $CH_1(0)$ to $CH_5(0)$ and $CH_1(1)$ to $CH_5(1)$ of the first two lines of memory 19 indicate the logic channel number CHx, for example 12 (01100), assigned to this transmission channel. Since it is a transmission at 128 Kbits/s, bits $V1(0)$ to $V8(0)$ all are at state "1". Conversely, bits $V9(0)$, $V10(0)$, $V11(0)$, $V9(1)$, $V10(1)$ and $V11(1)$ all are at state "0". At the address 01100, memory RCM 30' contains configuration information of controller RX-HDLC 6 for the logic channel CHx.

During the eight bit cycles of a first time slot of a frame of the transmission, counter 18 issues the read address 00000 of memory 19. Bits $V1(0)$ to $V8(0)$ are sent to controller RX-HDLC 6 at the bit clock rate during this time slot, using the three least significant bits of counter 18. Bits $CH_1(0)$ to $CH_5(0)$ are sent to address memory RCM 30' and auxiliary memory 8. Thus, controller RX-HDLC 6 is able to store, successively, in auxiliary memory 8, the eight bits received.

In the following time slot $TS_1$, a similar operation is reproduced and auxiliary memory 8 thus contains a sixteen-bit word to be stored in memory 3. The addressing of memory 40' being performed, in write mode, by the number 01100 of logic channel CHx, this word can be stored therein by controller RX-HDLC 6.

Controller RX-DMAC 12 will thus be able to execute the encoded instruction from controller 6 and contained in memory 39' after processing the preceding instructions relative to other logic channels. It then transfers to memory 3, at an address calculated according to the number 01100 of channel CH'x, the word contained at address 01100 in memory 40'.

Circuit 17 for assigning time slots is, according to the invention and as shown in FIG. 1, common to the transmit and receive sections of transfer device 1. Therefore, it is, for example, intended to transfer transmissions from a multiplex of thirty-two incoming time slots to a multiplex of thirty-two outgoing time slots, or conversely. Device 1 is not involved in the routing of these transmissions which is performed, conventionally, within a switch array (not shown).

By assigning, on the receive side, a logic channel number to each time slot TSy of the multiplex, the logic channel number associated with this time slot TSy is the same for the transmit side. That is, this logic channel number is not transmitted to the multiplex and is only used within transfer device 1 according to the invention to organize the writing into and the reading from RAM 3 as well as the sharing of controllers TX-HDLC 5, RX-HDLC 6 between the different time slots TSy of the multiplex and of controllers TX-DMAC 11 and RX-DMAC 12 between the different channels.

Of course, the present invention is likely to have various alterations, modifications, and improvements which will readily occur to those skilled in the art. In practice, each of the elements described can be replaced by one or several elements performing the same function.

Moreover, although the preceding description has been made in relation with an example of a multiplex of thirty-two time slots, the invention applies whatever the number of time slots of the multiplex. It is enough, for this purpose, to adapt the number of bits of counter 18 and the size (number of words) of auxiliary memories 7, 8, 13 and 14, of flow control and transfer FIFOs 39 and 39' and ACK-FIFO 40 and 40', of control memories TCM 30 and RCM 30' and of the time slot assignment memory TSA-MEM 19. The sizes of the words of the different memories can also be modified according to the multiplex for which the device according to the invention is meant.

Further, the time indications given as an example can be modified according to the multiplex for which the device according to the invention is meant. The device can be applied to faster rates by increasing the size (the number of words) of memories 13, 14, 39, 39', 40, 40' and 50.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalent thereto.

What is claimed is:

1. A device for transferring binary data between a time division multiplex and a RAM, comprising:

a first High Level Data Link (HDLC) controller for transmission between all channels of the multiplex and the RAM;

a second High Level Data Link (HDLC) controller for reception between all channels of the multiplex and the RAM; and means for assigning, to each of a plurality of time slots of the multiplex, a logical channel number which enables sharing of the first and second HDLC controllers between all channels of the multiplex.

2. A device for transferring binary data between a time division multiplex and a RAM, comprising:

a first High Level Data Link (HDLC) controller for transmission between all channels of the multiplex and the RAM;

a second High Level Data Link (HDLC) controller for reception between all channels of the multiplex and the RAM; and means for assigning, to each of a plurality of time slots of the multiplex, a logical channel number which enables sharing of the first and second HDLC controllers between all channels of the multiplex;

wherein said means for assigning includes a time slot assignment memory which is programmable by a microprocessor and two first auxiliary memories associated with the HDLC controllers, respectively for transmission and reception, the assignment memory and auxiliary memories having a number of words corresponding to a maximum number of possible multiplex channels, each word of the assignment memory containing at least a number of a logical channel to which a corresponding time slot is assigned, this number of the logical channel being sent, as an address, at least to the first auxiliary memories.

3. The transfer device according to claim 2, wherein addressing of the time slot assignment memory is performed, for a first time slot, by means of a counter of which the least significant bit of bits which constitute an address of said first time slot is incremented for each new time slot of the frame of the multiplex, the bits issued by the counter and constituting the address of said first time slot being sent to a first input of a first multiplexer, a second input of which receives an address issued by the microprocessor, this second input being selected, by the microprocessor, at the beginning of a new transmission associated with said each new time slot.

4. The transfer device according to claim 3, wherein the time slot assignment memory further includes, for each HDLC controller, a number of set bits at least equal to the number of bits contained in each time slot of the frame of the multiplex and one bit for enabling the presence of at least one transmission which uses only one bit of the corresponding time slot in the frame of the multiplex, the state of each of the set bits indicating the position of the bits of the considered time slot which contain information relative to the transmission with which said corresponding time slot is associated.

5. The transfer device according to claim 4, wherein the counter is a nine-bit counter incremented by a bit clock of the frame of the multiplex and whose three least significant bits of which are sent to the HDLC controllers, the most significant bit of the counter determining the even or odd rank of the current frame of the multiplex and to be combined with an enable bit, the five intermediate bits constituting the address of the considered time slot in the time slot assignment memory and the eight least significant bits of the counter being reset for each new frame of the multiplex.

6. The transfer device according to claim 2, wherein each HDLC is associated with separate control memory, respectively for transmission and reception, programmable by the microprocessor, the reading of each said control memory being addressed by the logic channel number issued by the time slot assignment memory, each control memory containing, for each logic channel, characteristics relative to the type of transmission associated therewith and, in particular, at least one bit for configuring the transmission HDLC controller or reception HDLC controller, between a transparent mode where each HDLC controller does not process the data and a mode where each HDLC controller performs a processing relative to an HDLC frame.

7. The transfer device according to claim 2, including at most two Direct Memory Access (DMA) controllers each respectively associated with the HDLC controllers for transmission and the HDLC controllers for reception, the DMA controllers being also shared between all the channels of the multiplex.

8. The transfer device according to claim 7, including two flow control FIFO memories, one for transmission and one for reception, for storing the logic channel number issued by the time slot assignment memory as well as an encoded instruction issued by the HDLCs, respectively for transmission and reception, the logic channel number contained in each flow control FIFO memory being used as an address for a second auxiliary memory which is associated with each DMA controller, respectively for transmission and reception, the encoded instruction being addressed to each DMA controller.

9. The transfer device according to claim 8, wherein the logic channel number read from each flow control FIFO memory constitutes a write address in a data transfer memory which is associated with each DMA controller with which this flow control FIFO memory is associated, a read address of the data transfer memory corresponding to the logic channel number read from the time slot assignment memory.

10. The transfer device according to claim 7, wherein the receive HDLC controller is associated with a memory for recognizing an address field of the receiver which is a destination of a point/multi-point mode transmission, said address field recognition memory being written to by the microprocessor and read from by the receive HDLC controller upon command of the receive control memory.

11. A device for transferring binary data between a time division multiplex and a RAM, comprising:

a first High Level Data Link (HDLC) controller for transmission between all channels of the multiplex and the RAM;

a second HDLC controller for reception between all channels of the multiplex and the RAM; and circuitry configured to assign, to each of a plurality of time slots of the multiplex, a logical channel number which enables sharing of the first and second HDLC controllers between all channels of the multiplex.

12. The device of claim 11, further comprising:

a first auxiliary memory associated with the first HDLC controller; and a second auxiliary memory associated with the second HDLC controller;

wherein the circuitry comprises a time slot assignment memory that is programmable by a microprocessor; and wherein the assignment memory and the first and second auxiliary memories each have the ability to store a number of words corresponding to a maximum number of possible multiplex channels, each word of the assignment memory containing at least a number of a logical channel to which a corresponding time slot is assigned, said number of the logical channel being sent, as an address, at least to the first auxiliary memory.

13. The device of claim 12, wherein addressing of the time slot assignment memory is performed, for a first time slot, by means of a counter of which the least significant bit of bits which constitute an address of said first time slot is incremented for each new time slot of the frame of the multiplex, the bits issued by the counter and constituting the address of said first time slot being sent to a first input of a first multiplexer, a second input of which receives an address issued by the microprocessor, this second input being selected, by the microprocessor, at the beginning of a new transmission associated with said each new time slot.

14. The device of claim 12, further comprising:
   a first Direct Memory Access (DMA) controller associated with the first HDLC controller to be shared between all channels of the multiplex; and
   a second DMA controller associated with the second HDLC controller to be shared between all channels of the multiplex.

15. The device of claim 14, further comprising:
   a first FIFO memory for transmission for storing the logical channel number issued by the time slot assignment memory as well as an encoded instruction issued by the first HDLC; and
   a second FIFO memory for reception for storing the logical channel number issued by the time slot assignment memory as well as an encoded instruction issued by the second HDLC;
   wherein the logical channel number contained in each flow control FIFO memory is to be used as an address for a second auxiliary memory which is associated with each of said first and second DMA controllers, the encoded instruction being addressed to each of said first and second DMA controllers.

16. The device of claim 15, wherein the logical channel number read from each flow control FIFO memory comprises a write address in a data transfer memory which is associated with each DMA controller with which the flow control FIFO memory is associated, a read address of the data transfer memory corresponding to the logical channel number read from the time slot assignment memory.

17. The device of claim 14, wherein the second HDLC controller is associated with a memory for recognizing an address field of the receiver which is a destination of a point/multi-point mode transmission, said address field recognition memory being written to by the microprocessor and read from by the second HDLC controller upon command of the receive control memory.

* * * * *